Jan. 16, 1934. G. C. COOK 1,943,297
CINDER OR DUST COLLECTOR
Filed Nov. 8, 1929 3 Sheets-Sheet 1

INVENTOR
George C. Cook
BY
ATTORNEY

Jan. 16, 1934.  G. C. COOK  1,943,297
CINDER OR DUST COLLECTOR
Filed Nov. 8, 1929  3 Sheets-Sheet 2

INVENTOR
George C. Cook
BY
ATTORNEY

Jan. 16, 1934.   G. C. COOK   1,943,297
CINDER OR DUST COLLECTOR
Filed Nov. 8, 1929   3 Sheets-Sheet 3
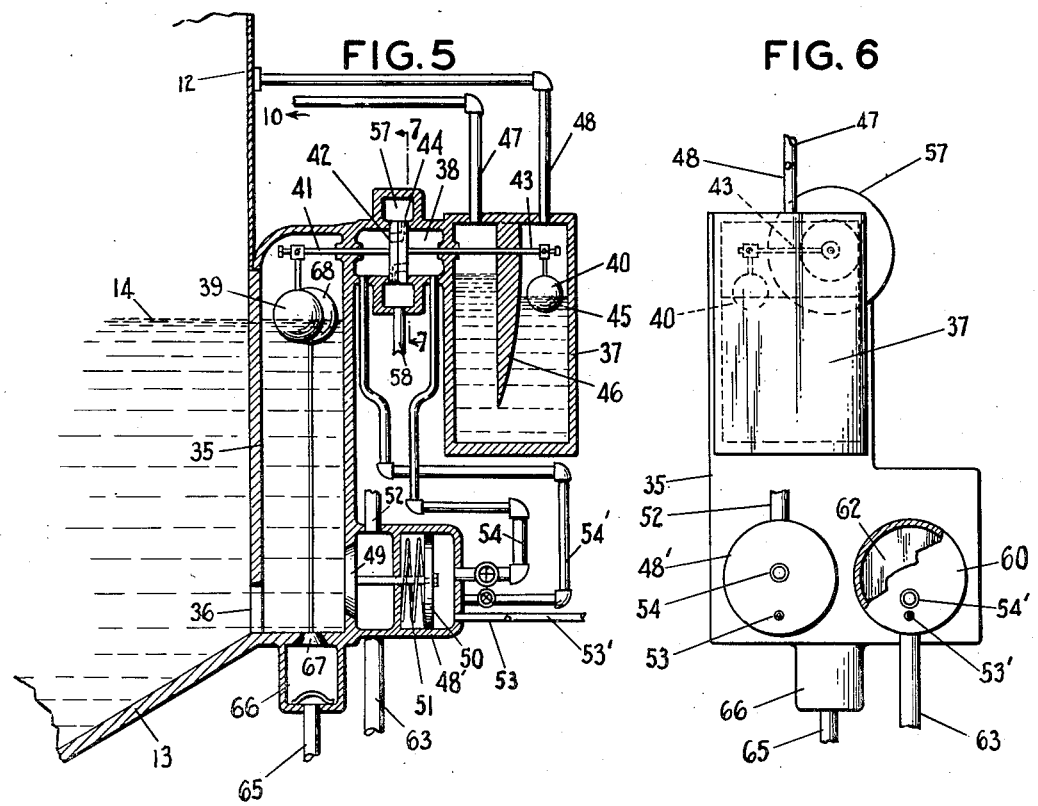
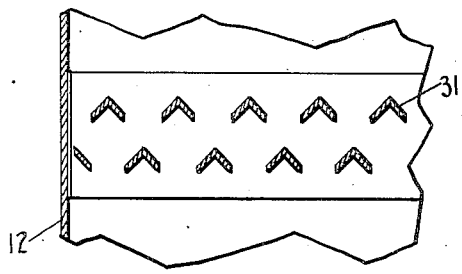
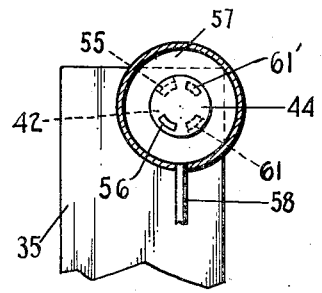
INVENTOR
George C. Cook
BY
ATTORNEY Patented Jan. 16, 1934

1,943,297

UNITED STATES PATENT OFFICE 1,943,297

CINDER OR DUST COLLECTOR

George C. Cook, Millington, N. J.

Application November 8, 1929. Serial No. 405,593

9 Claims. (Cl. 183—24)

The invention relates to apparatus for the removal of solid matter suspended in or entrained with gases such as those resulting from the combustion of coal and other fuel, and the dust resulting from the operation of cement kilns and ovens and of a more or less comminuted nature.

It has for its object novel apparatus of this character whereby a stream of gas carrying the solid particles may be substantially freed from the entrained matter in a simple and effective manner, the solid matter being trapped in a liquid upon which the gas is caused to impinge. A further object of the invention resides in the provision of means for accommodating the apparatus to cinder or dust laden gases at different velocities. The invention contemplates, also, a construction whereby an interchange of heat between the incoming and the outgoing, solids-freed gas takes place, thus assisting in maintaining the latter gas above its dew point.

In carrying out the invention, the incoming gas with entrained solid matter is caused to impinge at relatively high velocity against, and in a direction substantially normal to, the surface of a body of liquid such as water contained in a suitable tank, then reversed in direction of flow and discharged at a substantially less velocity to reduce the inertia of any escaping particles, whereby substantially all of the solid matter is delivered to the water, settling out therein and from which it is subsequently removed. There may also be connected with said tank means for maintaining the height or level of the water therein substantially constant, or causing the same to vary (inversely) with the change in velocity of the gas.

The nature of the invention, however, will best be understood when described in connection with the accompanying drawings, in which:

Fig. 4 is a fragmentary transverse section taken on the line 4—4, Fig. 1 of the drawings.

Fig. 5 is a fragmentary vertical section of apparatus for automatically conforming the liquid level to the velocity of the incoming gases.

Fig. 6 is a side elevation thereof.

Fig. 7 is a fragmentary vertical section taken on the line 7—7, Fig. 5 of the drawings, and looking in the direction of the arrows.

Figure 1:
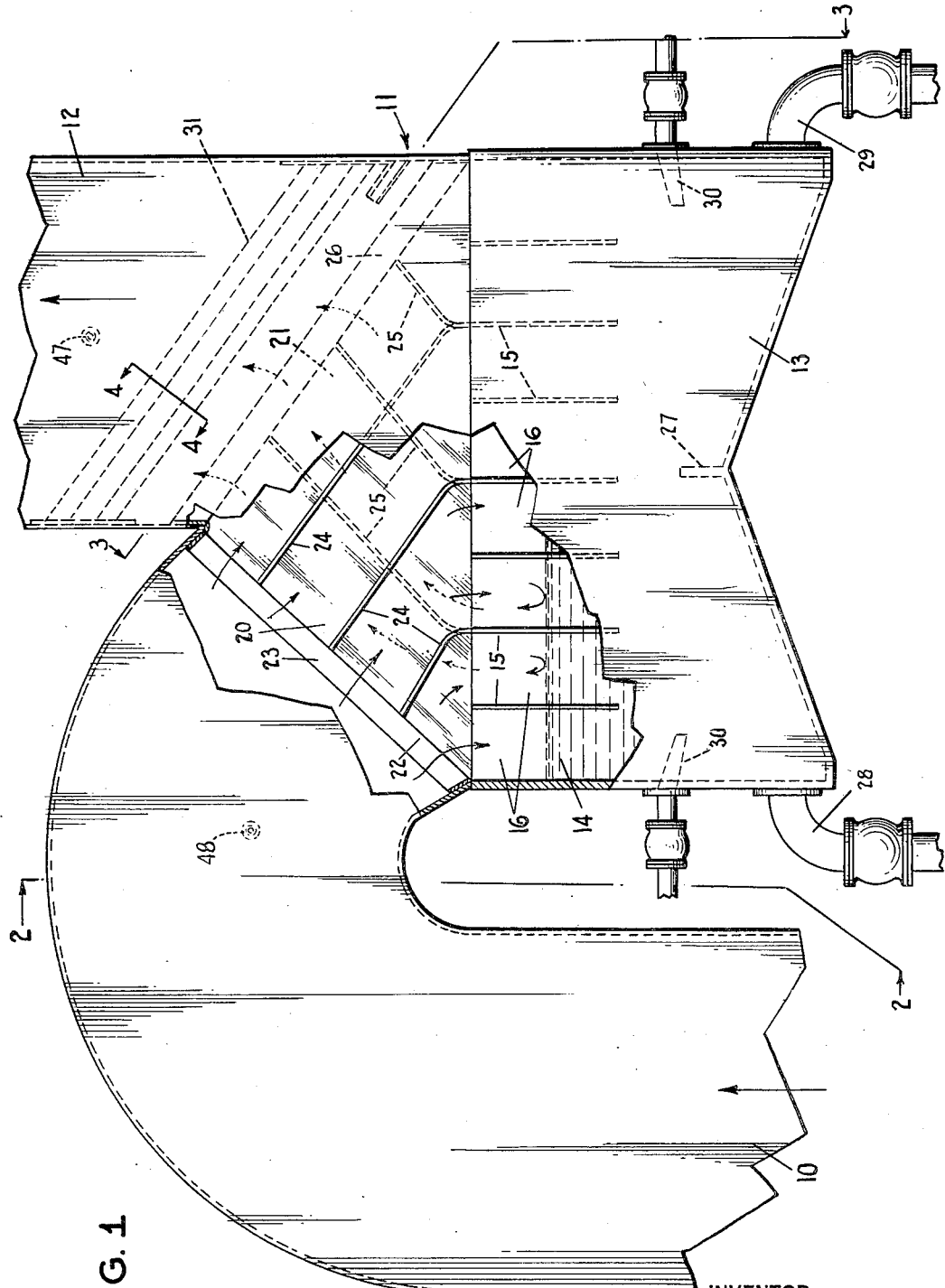
Fig. 1 is a front elevation of the novel apparatus with a portion broken away to disclose the interior of the separator.
Figure 3:
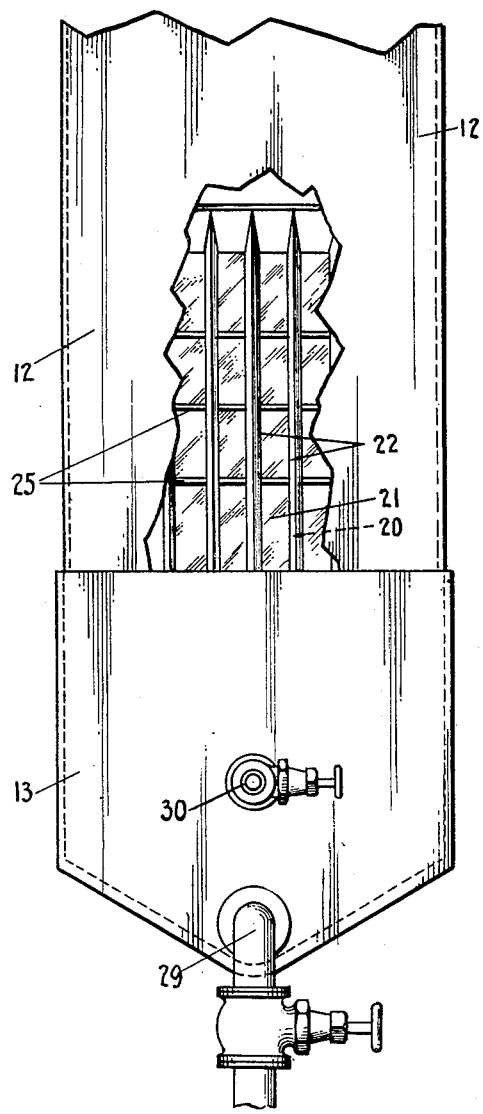
Fig. 3 is a similar view taken on the line 3—3, Fig. 1 of the drawings.
Figure 2:
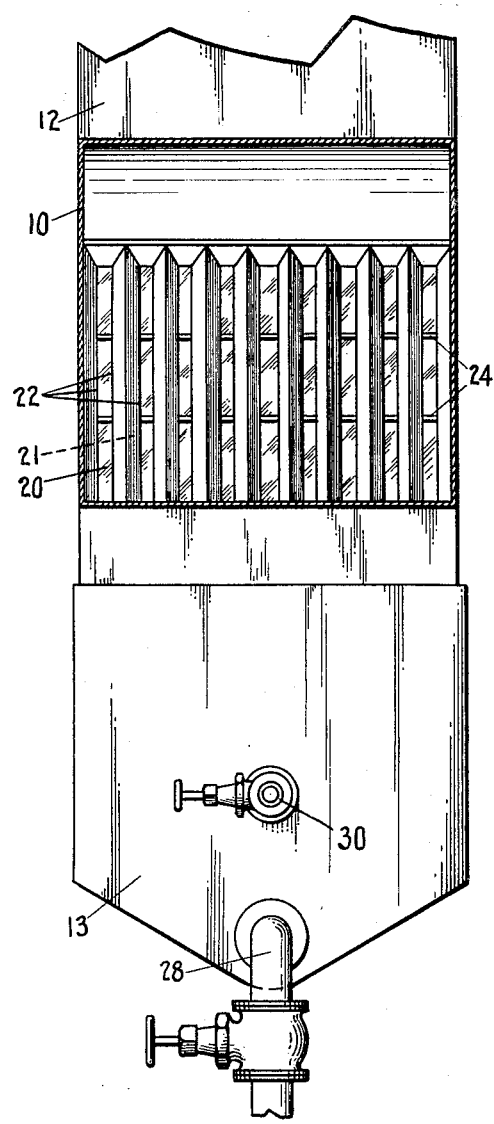
Fig. 2 is a vertical section therethrough taken on the line 2—2, Fig. 1 of the drawings and looking in the direction of the arrows.

Referring to the drawings, 10 designates a flue or duct for incoming gas such as the gases resulting from the combustion of fuel in the operation of boilers, kilns, ovens, etc., or gases from other sources and containing solid matter suspended therein or entrained therewith. The gas is designed to be led through the duct 10 to the novel separator member which embodies an enclosing casing 11 and from which said gas is eventually discharged through an outlet flue or duct 12, after having been cleaned of the entrained solid matter. Casing 11 communicates with a lower or liquid-containing chamber 13 designed to retain water 14 of a substantially constant level which may be automatically maintained constant, or may be conformed to varying gas velocities as hereinafter set forth.

It is preferred to have dip therein a series of vertically disposed and transversely arranged plates 15, the bottom edges thereof being always located below the water level to prevent short-circuiting of the compartments 16 formed between the respective plates and adapted to receive the incoming gases. The gas is designed to be delivered at relatively high velocity and in a direction substantially normal to the level of liquid 14, impinging on its surface and delivering thereto a large proportion of the contained solid material.

For example, casing 11 is divided into a series of alternate narrow and wide longitudinal passageways 20 and 21 respectively by adjacently disposed triangular-shaped plates 22, preferably of sheet metal. The respective outer edges of the two adjacent plates forming a wide passageway 21 are extended at the entrance portion somewhat beyond the plates to form turned-over flaps 23 which are bent over to overlap and close off at this particular or entrance portion of the casing the wide passageways 21. This will leave a series of successive narrow entrance passageways 20 to the casing for the incoming gas and alternating with the intermediate closed portions constituted by the flaps 23. By thus restricting or reducing the entrance area for the incoming gas, its velocity will be appreciably increased; and it is preferred, furthermore, to divert the gas to a substantially perpendicular impingement on the surface of water 14, as well as to prevent eddying thereof in the passageways, by means of diagonally disposed partition members 24 located between the plates 22 forming the said narrow passageways.

After striking the water surface, the direction of flow of the gas is designed to be substantially reversed and the gas to this end is directed to the outlet duct 12 through the wider passageways 21, being assisted by diagonally disposed partitions 25 located between the plates forming the said wider passageways. The partitions or guides 24 and 25 serve also to brace the various plates 22 structurally.

In order to confine the incoming gas to the said narrow passageways and direct it to the liquid 14, as aforesaid, the respective outer edges at the opposite side of the triangular plates forming the narrow passageways are likewise extended and bent to form turned-over flaps 26 which close off the said narrow passageways at this or outlet portion, it being understood that the separator is entirely open along the base edges. It will be appreciated also that as the gas is reversed, after striking the surface of the water, it enters the wider compartments 21 and the velocity is thus reduced, assisting the settling out of any remaining solid matter therefrom due to its movement in a direction opposed to the action of gravity and in that its inertia is also correspondingly lowered. In view of the alternate arrangement of these passageways for the gas, an interchange or transfer of heat from the incoming gas to the outgoing gas results, which is conducive to the maintenance of the latter above its dew-point.

This solid matter removed by direct impingement as well as that settling out from the outgoing gases is caught in the water and settles on the bottom of the liquid-containing chamber 13, the bottom of which is hopper-shaped and is provided with a transverse separating wall 27. Outlet lines 28 and 29 connected to the bottom of the chamber 13 serve to remove from time to time collected solid matter; and if the same should hang up and not flush out freely, the said removal may be assisted by a pair of jets 30 directed into the bottom of the hopper and serving to wash out said matter to the outgoing lines 28 and 29.

Any spray entrained with the outgoing gas delivered into outlet 12 is readily removed therefrom by the installation of inclined eliminator plates 31 disposed diagonally of said duct across the same and comprising one or more series of angle plates or V-shape members, the individual plates of the successive rows being staggered as indicated in Fig. 4 when more than one row of such plates is employed. An inclined gutter 32 secured along the outlet wall below these plates serves to carry any liquid collected to one side of the duct and from which it drains to the chamber 13.

It has been found that greater efficiency in the removal of solid matter from the gas will be obtained at a given velocity of flow by a water level of a definite predetermined height, that is, for a low velocity a high level should be maintained in the chamber 13 and vice versa. Provision has therefore been made to automatically vary the water level in a given relation to the velocity of the incoming gas through the apparatus, reference being had more particularly to Figs. 5 to 7, inclusive.

As shown, there is attached to the chamber 13 an additional casing providing a float chamber 35 communicating with the former chamber through an opening 36 at the bottom of the separating wall so that the same level of water 14 is maintained in the float chamber as in the water chamber 13. A further float chamber 37 and an intermediate control chamber 38 are carried by the casing forming the float chamber 35; and floats 39 and 40 are mounted in the respective chambers 35 and 37.

Float 39, moreover, is rigidly connected to a horizontally mounted shaft 41 to rotate the same and to which shaft there is rigidly attached a ported disk 42, while float 40 is similarly rigidly secured to a horizontally mounted shaft 43, to rotate the same, and carrying a ported disk 44 mounted adjacently the disk 42. The ports of the respective disks, furthermore, are adapted to cooperate with each other to provide through passageways under certain conditions.

The relative positions of these disks will be determined by the corresponding levels of the water 14 of chamber 13 and the level of the water 45 in chamber 37, the latter level in turn being dependent upon the differential pressure existing in the two halves of the chamber formed by a transverse dividing wall or partition 46 extending into the liquid. The opposite compartments formed thereby are arranged to be in communication respectively with the inlet duct 10 through a pipe 47 and the outlet duct 12 through a pipe 48. The action of float 40 and the operation of its control ported disk 44 will thus be dependent upon the velocity of the gas flow, through the separator, that is to say, the difference of pressures existing in the inlet and outlet ducts 10 and 12, respectively. Furthermore, the actual motion of float 40 may be modified to vary otherwise than in direct proportion to the pressure change as by altering the contour of the walls of the compartments, or by varying the thickness of the dividing wall 46, as shown.

Liquid is arranged to be admitted to the chamber 35 through a suitable valve device 48' when the level in chamber 13 is below that desired; and to this end, a valve disk 49 is seated in a wall of chamber 35 at the bottom thereof and is connected to a piston 50, movable in the valve device and urged by a spring 51 in a direction to lift valve disk 49. Liquid is arranged to be introduced to the said valve device through an inlet pipe 52 connected to a suitable source (not shown) of liquid under pressure, while liquid under pressure is similarly introduced on the opposite side of piston 50 through an inlet pipe 53, the pressure of which is sufficient to hold normally the valve disk 49 to its seat. However, a leak-off connection 54 is taken from the valve device on the pressure side of piston 50 and is of larger area than the liquid inlet 53 thereto, said leak-off connection communicating with a compartment of intermediate control chamber 38 behind ported disk 44.

In operation, the position of valve disk 49 will then be dependent upon the velocity of the gas passing through the separator, for example, if the level in chamber 35 is too low, then the port 55 of disk 42 will register partly or completely with port 56 of disk 44. Port 55, furthermore, vents to an annular compartment 57 surrounding chamber 38 and from which compartment extends a waste pipe 58. Leakage will, therefore, occur through the leakage connection 54 to reduce the pressure on the corresponding side of piston 50, permitting spring 51 to lift the valve disk 49 off its seat to allow liquid to enter the chamber 35 and from same the chamber 13. As the level rises therein, float 39 will correspondingly rotate disk 42 to again close the port 56 in disk 44 when the desired level has been attained.

If the level in chamber 35 should attain too great a height, leakage from a further valve device 60, fed from pipe 53′ and located adjacent the valve device 48′, would occur through a similar leak-off line 54′ and the further port 61 of disk 44 and 61′ of disk 42, a valve disk 62 of said valve device 60 being lifted off its seat due to the reduced pressure thereon as in the arrangement described in connection with the valve device 48′. The leak-off water is discharged then into chamber 57 and from the same to the waste pipe 58. Opening of the valve disk 62 would also cause liquid to be discharged from the chamber 35 as through a waste line 63 connected to the float chamber side of the valve device 60.

When the gas passing through the separator is at a relatively high temperature, it is generally necessary to furnish a constant supply of cool water to the compartment 13. This may be attained by a feed connection 65 to an auxiliary chamber 66 at the bottom of chamber 35 and adapted to communicate therewith through a valve 67 controlled by a float 68 attached thereto and floating on the liquid of chamber 35. When there is no flow of gas through the separator, the water level in chamber 35 will be at its highest position and the float 68 will consequently hold valve 67 closed. When, however, the level drops in compartment 35 with increasing gas velocity, valve 67 opens proportionately to supply the required water thereto.

It will be appreciated that, through contact with the liquid of the body of gas passing through the separator, any constituent gases thereof soluble in such liquid will be absorbed to a large extent thereby, and the collector apparatus is thus equally applicable to the removal of such gases whether accompanied by particles of foreign matter or not.

I claim:

1. Apparatus for trapping particles in suspension in a gas current, embodying a tank containing liquid, an inlet duct conveying said current and an outlet duct for the cleansed gas, an interposed separator casing comprising a plurality of adjacent compartments in juxtaposed relation to the said ducts, alternate compartments being in communication with and out of communication with each of said ducts to form alternate passageways all of which open to the said tank, and transverse partitions in said tank adjacent the base of the separator and the lower edges thereof dipping into the liquid of the tank.

2. Apparatus for trapping particles in suspension in a gas current, embodying a tank containing liquid, an inlet duct conveying said current and an outlet duct for the cleansed gas, an interposed separator casing comprising a plurality of adjacent compartments in juxtaposed relation to the said ducts, alternate compartments being in communication with and out of communication with each of said ducts to form alternate passageways all of which open to the said tank, and guiding means within said passageways to direct the gas to the surface of the liquid in said tank and from the same to the outlet duct.

3. Apparatus for trapping particles in suspension in a gas current, embodying a tank containing liquid, an inlet duct conveying said current and an outlet duct for the cleansed gas, an interposed separator casing comprising a plurality of adjacent compartments in juxtaposed relation to the said ducts, alternate compartments being in communication with and out of communication with each of said ducts to form alternate passageways all open to the said tank, guiding means within said passageways to direct the gas to the surface of the liquid in said tank and from the same to the outlet duct, and means in the outlet duct to remove spray from the cleansed gas.

4. Apparatus for trapping particles in suspension in a gas current, embodying a tank containing liquid, an inlet duct conveying said current and an outlet duct for the cleansed gas, in interposed separator casing comprising a plurality of adjacent compartments in juxtaposed relation to the said ducts, alternate compartments being in communication with and out of communication with each of said ducts to form alternate passageways all open to the said tank, guiding means within said passageways to direct the gas to the surface of the liquid in said tank and from the same to the outlet duct, means in the outlet duct to remove spray from the cleansed gas, and a gutter to collect the removed spray.

5. Apparatus for trapping particles in suspension in a gas current, embodying a tank containing liquid, an inlet duct conveying said current and an outlet duct for the cleansed gas, and an interposed separator casing, comprising a plurality of partitions adjacently disposed and alternately spaced apart at different distances and such as to afford inlet and outlet passageways for the gas, the outlet passageways being of greater cross-sectional area normal to the flow of gas therethrough and edges of the partitions being located in juxtaposition to the respective ducts and alternately turned over to close off a passageway to its duct and provide converging inlets and diverging outlets respectively to a passageway, said passageways all opening to said tank.

6. Apparatus for trapping particles in suspension in a gas current, embodying a tank containing liquid, an inlet duct conveying said current and an outlet duct for the cleansed gas, and an interposed separator casing, comprising a plurality of triangular-shaped plates adjacently disposed parallel to each other longitudinally to the flow of gas, spaced apart alternately at different distances and the plates being extended at their edges and bent over to close off alternately the passageways formed therebetween to provide converging inlets and diverging outlets respectively to a passageway, said passageways all opening to said tank.

7. Apparatus for trapping particles in suspension in a gas current, embodying a tank containing liquid, an inlet duct conveying said current and an outlet duct for the cleansed gas, an interposed separator casing, comprising a plurality of triangular-shaped plates adjacently disposed parallel to each other longitudinally to the flow of gas, spaced apart alternately at different distances and the two sides of the triangular-shaped plates being extended at their respective edges and alternately turned over to close the passageways therethrough and staggered relatively to each other, the plates at their bases opening to the said tank, and transverse partitions in said tank adjacent the bases of said triangular plates and the lower edges thereof dipping into the liquid of the tank.

8. Apparatus for trapping particles in suspension in a gas current, embodying a tank containing liquid, an inlet duct conveying said current and an outlet duct for the cleansed gas, an interposed separator casing comprising a plurality of adjacent compartments in juxtaposed relation to the said ducts, alternate compartments being in communication with and out of communication with each of said ducts to form alternate passageways all of which open to the said tank, and means to vary automatically the liquid level in accordance with the velocity of the gas passing through the said apparatus.

9. Apparatus for trapping particles in suspension in a gas current, embodying a tank containing liquid, an inlet duct conveying said current and an outlet duct for the cleansed gas, and an interposed separator casing, comprising a plurality of partitions adjacently disposed and spaced apart to afford inlet and outlet passageways, the edges of the partitions being located in juxtaposition to the respective ducts and united in alternate pairs in staggered relationship at opposite ends to provide converging inlets and diverging outlets respectively to said passageways, and all of which open to the said tank.

GEORGE C. COOK.